M. A. THIEL.
PISTON ROD PACKING.
APPLICATION FILED NOV. 18, 1910.
1,003,162.
Patented Sept. 12, 1911.
2 SHEETS—SHEET 1.
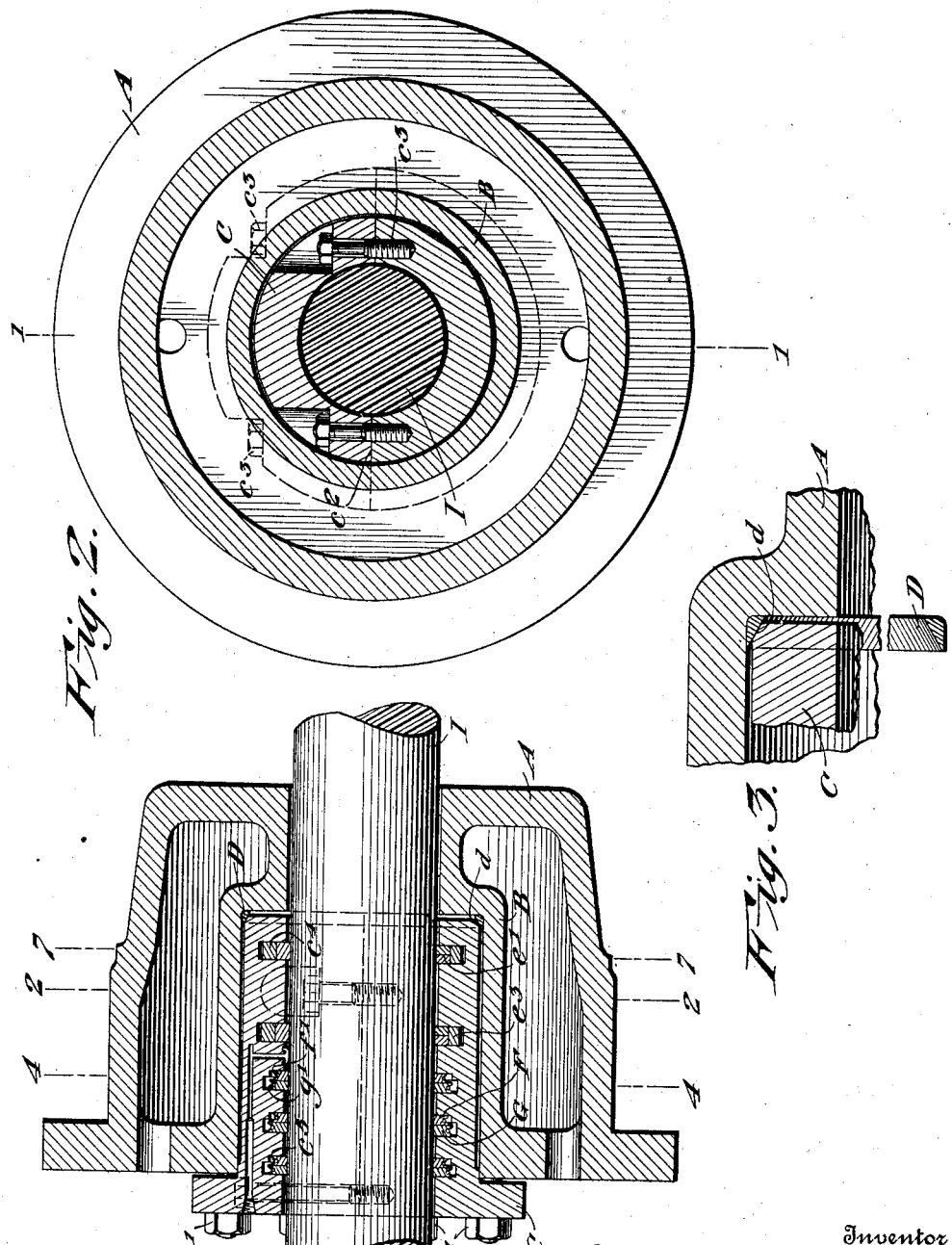

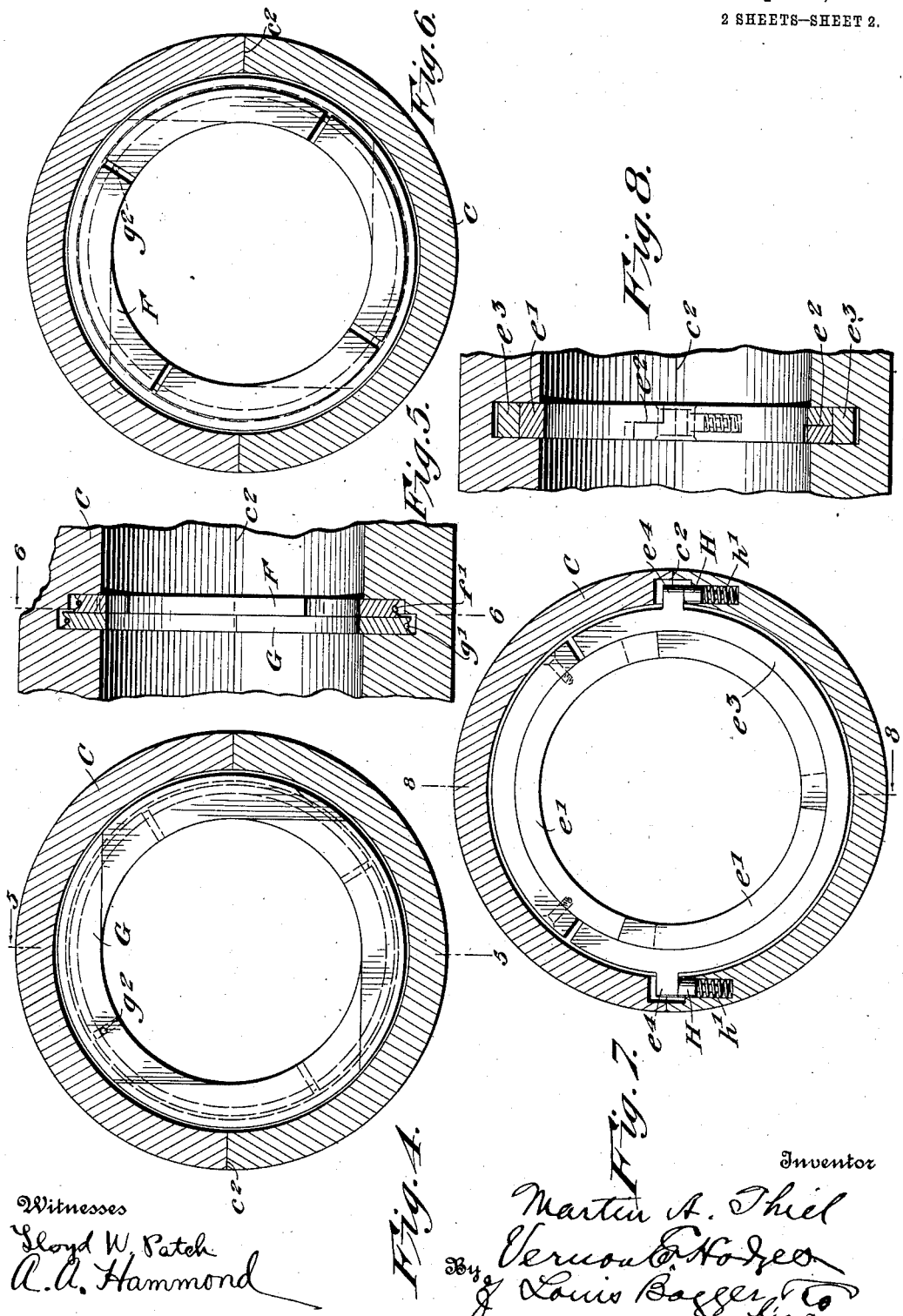

UNITED STATES PATENT OFFICE.

MARTIN A. THIEL, OF MOUNT VERNON, OHIO.

PISTON-ROD PACKING.

1,003,162.      Specification of Letters Patent.     Patented Sept. 12, 1911.

Application filed November 18, 1910. Serial No. 593,063.

*To all whom it may concern:*

Be it known that I, MARTIN A. THIEL, a citizen of the United States, residing at Mount Vernon, in county of Knox and State of Ohio, have invented certain new and useful Improvements in Piston-Rod Packings, of which the following is a specification.

My invention relates to an improvement in piston rod packings, and it consists in certain improvements in the construction thereof, as will be hereinafter fully described and pointed out in the claims.

More particularly the invention applies to metallic piston rod packing, in which it is desirable to keep the rings in their proper places, and the split case tight.

In the accompanying drawings:—Figure 1 shows a section on the line 1—1 of Fig. 2, Fig. 2 shows a section on the line 2—2 of Fig. 1, Fig. 3 shows a fragmentary section through the taper soft metal gasket in bottom of stuffing box between cylinder head and packing case, Fig. 4 shows a section on the line 6—6 of Fig. 5, Fig. 5 shows a section on the line 5—5 of Fig. 4, Fig. 6 a section from opposite side on the line 6—6 of Fig. 5, Fig. 7 a section on the line 7—7 of Fig. 1, Fig. 8 a section on the line 8—8 of Fig. 7.

A, marks the cylinder head, B the stuffing box. These may be of ordinary construction. The stuffing box may be integral or attached to the cylinder head. The casing C is in halves, held in place by studs C' against soft metal gasket D which engages the tapered surface $d$ of the casing C, making a joint between cylinder head A and casing C, besides closing the split joint $C^2$ of casing C, primarily held together with dowel studs $C^3$.

The split casing C is provided with annular grooves $C^4$ and $C^5$ to hold the packing rings $e'$, $e^3$, $f$, and $g$. The rings $e'$, $e^3$ acting as a breaker ring against the high explosion pressures in gas engine cylinders, being constructed of two concentric rings made up of segments. The inner portion $e'$ has lapped joints $e^2$ and is held together by the long segment of the outer portion $e^3$ which is of smaller bore and snapped on. The ring $e^3$ is provided with lugs $e^4$, which rest on plungers H supported on springs $h'$ resting in lower half of casing C, and will take the weight of breaker ring off piston rod 1, Figs. 1 and 2, thereby reducing wear.

Ring F, Figs. 5 and 6, is cut radially into four segments and of smaller diameter than ring G, which latter is made up of four tangentially cut segments, both held together with garter springs $f'$ and $G'$. The segments are kept in place to mismatch joints by dowel $g^2$, Fig. 4.

Ring grooves $C^5$ in casing C, Fig. 1, are made with a step bottom in order to prevent rings F and G being wrongly placed while the packing is being assembled, for should ring F be placed back of ring G, the pressure would blow it apart and soon wreck it.

It is evident that more or less slight changes might be resorted to in the form and arrangement of the several parts described, without departure from the spirit and scope of my invention, and hence I do not wish to limit myself to the exact construction herein set forth, but:—

Having fully described my invention, what I claim as new and desire to secure by Letters Patent, is:—

1. In a piston rod packing, the combination of a split casing having annular stepped grooves therein, and packing rings of different diameters placed in said grooves, whereby to insure correct assembling.

2. In a piston rod packing, the combination with a casing having annular grooves therein, of springs supported in the casing, and a breaker ring having means thereon which rest on said springs.

3. In a piston rod packing, the combination with a split casing having internal grooves therein, one of the sections of which has springs therein, of a breaker ring having lapped joints, said ring located in the grooves and provided with means constructed and adapted to rest against said spring.

4. In a piston rod packing, the combination with a casing having internal grooves therein, of a breaker ring received in the grooves, said ring having lapped joints and provided with lugs, of projecting springs against which said lugs rest, the casing constituting a housing for the rings, lugs, and springs.

5. In a piston rod packing, a casing having an annular ring groove therein, one end of which is provided with a step bottom, and tangentially and radially cut sectional rings of different diameters located in said step groove.

6. In a piston rod packing, a casing having protected springs therein, and a breaker ring having lugs resting on said springs for the purpose of floating said ring to reduce the wear.

7. In a piston rod packing, a casing having protected springs therein, and a breaker ring composed of lapped segments, and having lugs.

8. In a piston rod packing, a grooved casing and breaker ring having lapped segments butted together, and located in the groove of the casing to prevent explosive pressure in the groove of the casing from closing said ring onto the piston rod.

In testimony whereof I affix my signature, in the presence of two witnesses.

MARTIN A. THIEL.

Witnesses:
WM. L. ROBINSON,
EDW. DEVER.

---

Copies of this patent may be obtained for five cents each, by addressing the "Commissioner of Patents, Washington, D. C."